(12) United States Patent
Ruzycky

(10) Patent No.: US 7,886,999 B2
(45) Date of Patent: Feb. 15, 2011

(54) FOOD GRINDER

(75) Inventor: Ewhan Ruzycky, 15 Sylvan Avenue, Toronto, ON (CA) M6H 1G2

(73) Assignee: Ewhan Ruzycky, Toronto (CA)

( * ) Notice: Subject to any disclaimer, the term of this patent is extended or adjusted under 35 U.S.C. 154(b) by 417 days.

(21) Appl. No.: 12/044,368

(22) Filed: Mar. 7, 2008

(65) Prior Publication Data

US 2009/0224088 A1 Sep. 10, 2009

(51) Int. Cl.
*A47J 17/00* (2006.01)
*A47J 43/00* (2006.01)
(52) U.S. Cl. .................................. 241/168; 241/169.1
(58) Field of Classification Search .................. 241/168, 241/169, 169.1
See application file for complete search history.

(56) References Cited

U.S. PATENT DOCUMENTS

| 267,535 | A | * | 11/1882 | Balding | 99/372 |
| 795,746 | A | * | 7/1905 | Wingfield | 206/238 |
| 2,147,394 | A | | 2/1939 | Austern et al. | |
| 3,581,790 | A | * | 6/1971 | Conte | 241/88.1 |
| 4,815,671 | A | * | 3/1989 | Akira | 241/169.1 |
| 6,517,018 | B2 | | 2/2003 | Manson | |
| 6,834,817 | B2 | * | 12/2004 | Manson | 241/169.1 |
| 6,945,486 | B2 | | 9/2005 | Teng | |
| 7,422,170 | B2 | * | 9/2008 | Bao | 241/168 |
| 2003/0006328 | A1 | * | 1/2003 | Manson | 241/169.1 |
| 2003/0015611 | A1 | * | 1/2003 | Teng | 241/169.1 |
| 2007/0262182 | A1 | * | 11/2007 | de Groote et al. | 241/169.1 |

* cited by examiner

*Primary Examiner*—Bena Miller
(74) *Attorney, Agent, or Firm*—Bereskin & Parr LLP/S.E.N.C.R.L., s.r.l.

(57) ABSTRACT

A grinder for a food item includes a top shell having a top axis, a top inner surface disposed about the top axis, and a plurality of top teeth extending downwardly from the top inner surface. The grinder further includes a bottom shell having a bottom axis, a bottom inner surface disposed about the bottom axis, and a plurality of bottom teeth extending upwardly from the bottom inner surface. A plunger is slidable within the cavity between a retracted position and an advanced position, the plunger having an upper surface directed away from the bottom inner surface, the upper surface having a perimeter configured for slidable engagement with an inner surface of the sidewall and a plurality of apertures in registration with the plurality of bottom teeth.

18 Claims, 15 Drawing Sheets

FOOD GRINDER

FIELD

Disclosed are one or more apparatuses or methods related to food preparation, and in particular to apparatuses or methods related to food grinding.

BACKGROUND

U.S. Pat. No. 795,746 discloses a disintegrating and storing case comprising an annular top member and an annular bottom member adapted to fit together to form a cylindrical box, each member being provided on its cylindrical exterior with a roughened gripping-surface whereby the two members may be rotated independently of each other, with interpenetrating teeth projecting upwardly from the bottom member and downwardly from the top member.

U.S. Pat. No. 2,147,394 discloses an ice cube crusher comprising a bottom container having a base wall and an upwardly extending skirt wall, a top container having a top wall and a downwardly extending skirt wall telescopically engaging said first skirt wall, a disc adjacent the end wall of each container, a plurality of tacks having their heads rested against said discs and their pointed ends directed towards each other, a perforated disc adjacent each of said discs and having the pointed ends of the tacks passing through the perforations thereof and engaging the heads of the tacks for holding same down, and the skirt walls of said containers having inwardly projecting portions engaging said discs for holding them fixed in position.

U.S. Pat. No. 6,517,018 discloses a device for comminuting material comprising first and second mating sections. The mating sections when mated form an enclosed interior chamber with the first and second sections capable of movement relative to each other. The first mating section has a first set of a plurality of pins, which extend from a base of the first mating section and into the interior of the chamber. Similarly, the second mating section has a second set of a plurality of pins extending from a base of the second mating section and into the interior of the chamber. The pins from the first mating section interdigitate with the second set of a plurality of pins when the first and second mating sections are mated, wherein movement of the first and second mating sections relative to one another causes comminution of the material when placed in the chamber. The pins have varying cross-sectional shapes including circular, triangular, and hexagonal.

U.S. Pat. No. 6,945,486 discloses a garlic tool that consists of a set of two disc-shaped presser units having respective male and female rotary grating means comprising a row of protruding grater elements each. Unpeeled garlic cloves are placed between the rotary grating means whereby they are peeled, pressed, and grated by hand-applied counter-twisting force.

SUMMARY

The following summary is intended to introduce the reader to this specification but not to define any invention. In general, this specification discusses one or more methods or apparatuses for grinding a food item.

According to some examples, a grinder for a food item, comprising a top shell having a top axis, a top inner surface disposed about the top axis, and a plurality of top teeth extending downwardly from the top inner surface; a bottom shell for moving between a first position in which the bottom shell is spaced apart from the top shell, and a second position in which the top shell and bottom shell are coupled together, the bottom shell having a bottom axis, a bottom inner surface disposed about the bottom axis, a sidewall extending upwardly from the bottom inner surface and defining a cavity, and a plurality of bottom teeth extending upwardly from the bottom inner surface; and a plunger slidable within the cavity between a retracted position and an advanced position, the plunger having an upper surface directed away from the bottom inner surface, the upper surface having a perimeter configured for slidable engagement with an inner surface of the sidewall and a plurality of apertures in registration with the plurality of bottom teeth; wherein in the retracted position an upper surface of the plunger is axially set back from an upper edge of the sidewall towards the bottom inner surface, and in the advanced position the upper surface of the plunger is axially displaced away from the bottom inner surface to position at least generally flush with the upper edge of the sidewall, each aperture receiving a respective one of the bottom teeth therethrough when the plunger is urged from the advanced position to the retracted position; and wherein the top axis and the bottom axis are generally collinear and define a rotation axis about which the top and bottom shells are rotatable relative to each other when the top and bottom shells are coupled together.

In some examples a gap between a peripheral edge of the upper surface of the plunger and the sidewall is minimal, and the peripheral edge has guide portions for slidably engaging with guide rails in the sidewall.

In some examples, the plunger has a plunger plate removably coupled to the bottom shell.

In some examples, the plunger is biased to return to the retracted position, and the plunger is movable from the retracted position to the advanced position when the bottom shell is spaced apart from the top shell.

In some examples, the top shell and bottom shell are configured to have an exterior shape corresponding to a food product.

In some examples, the grinder further comprises an actuator coupled to the grinder for moving the plunger within the cavity the actuator configured to inhibit movement of the upper surface of the plunger substantially beyond the upper edge of the sidewall.

In some examples, the top shell comprises a second plunger slidable between a retracted position and an extended position.

According to some examples, a grinder for a food item, comprising a top shell having a top axis and a top inner surface disposed about the top axis, the top inner surface having a top toothed region comprising a plurality of top teeth extending downwardly from the top inner surface, and the top inner surface having a top non-toothed region being substantially free of top teeth; a bottom shell movable between a first position in which the bottom shell is spaced apart from the top shell, and a second position in which the top shell and bottom shell are coupled together, the bottom shell having a bottom axis, a bottom inner surface disposed about the bottom axis, and a sidewall extending upwardly from the bottom inner surface and defining a cavity, the bottom inner surface having a bottom toothed region comprising a plurality of bottom teeth extending upwardly from the bottom inner surface, and the bottom inner surface having a bottom non-toothed region being substantially free of bottom teeth; wherein, when the top and bottom shells are coupled together, the top axis and the bottom axis are generally collinear and define a rotation axis about which the top and bottom shells are rotatable relative to each other, the top non-toothed region and the bottom non-toothed region are configured to align in vertical registration, and the top teeth and bottom teeth are configured to interlace with one another when the top and bottom shells are rotated.

In some examples, the top non-toothed region comprises at least one top non-toothed sector extending radially from the top axis to an outer periphery of the top inner surface, and the top toothed region comprises at least one top toothed sector extending radially from the top axis to the outer periphery of the top inner surface.

In some examples, the bottom non-toothed region comprises at least one bottom non-toothed sector extending radially from the bottom axis to an outer periphery of the bottom inner surface, and the bottom toothed region comprises at least one bottom toothed sector extending radially from the bottom axis to the outer periphery of the bottom inner surface.

In some examples, each of the top and bottom non-tooth sectors spans an angle of at least 45 degrees.

In some examples, the top and bottom shell include alignment indicators that indicate when the top non-toothed region and the bottom non-toothed region are at least partially aligned in vertical registration.

In some examples, the alignment indicators include the top shell having a top asymmetric profile and the bottom shell having a bottom asymmetric profile corresponding to the top asymmetric profile, the top non-toothed region and the bottom non-toothed region being aligned in vertical registration when the top and bottom asymmetric profiles are aligned.

In some examples, the alignment indicators include at least one top magnet in the top shell and at least one bottom magnet in the bottom shell, the top non-toothed region and the bottom non-toothed region being aligned in vertical registration when the at least one top and bottom magnets are engaged.

In some examples, at least one of the top teeth and bottom teeth are arranged in an arc pattern having a leading tooth and a trailing tooth, the trailing tooth circumferentially and radially spaced from the leading tooth.

In some examples, the arc pattern comprises an s-shaped pattern with a middle tooth circumferentially and radially spaced from both the leading tooth and the trailing tooth.

In some examples, each of the top teeth and bottom teeth have radially inner and radially outer surfaces extending in a generally circumferential direction, the radially outer surface being generally convex, and the radially inner surface being generally concave, and the radially inner and outer surfaces of the teeth converge to define cutting edges.

In some examples, the bottom teeth extend upward adjacent the top inner surface and the top teeth extend downward adjacent the bottom inner surface when the top and bottom shells are coupled together.

In some examples, the top teeth and bottom teeth define lanes that substantially occupy a radial distance between the rotation axis and the sidewall when the top and bottom shells are coupled together.

According to some examples, a grinder for a food item, comprising a top shell having a top axis, a top inner surface disposed about the top axis, and a plurality of top teeth extending downwardly from the top inner surface; a bottom shell for moving between a first position in which the bottom shell is spaced apart from the top shell, and a second position in which the top shell and bottom shell are coupled together, the bottom shell having a bottom axis, a bottom inner surface disposed about the bottom axis, a plurality of bottom teeth extending upwardly from the bottom inner surface, and a sidewall extending upwardly from the bottom inner surface and defining a cavity; and a plunger slidable within the cavity between a retracted position and an advanced position, the plunger having an upper surface directed away from the bottom inner surface, the upper surface having a perimeter configured for slidable engagement with an inner surface of the sidewall and a plurality of apertures in registration with the plurality of bottom teeth; wherein in the retracted position an upper surface of the plunger is axially set back from an upper edge of the sidewall towards the bottom inner surface, and in the advanced position the upper surface of the plunger is axially displaced away from the bottom inner surface to position at least generally flush with the upper edge of the sidewall, each aperture receiving a respective one of the bottom teeth therethrough when the plunger is urged from the advanced position to the retracted position; wherein the top axis and the bottom axis are generally collinear and define a rotation axis about which the top and bottom shells are rotatable relative to each other when the top and bottom shells are coupled together, and at least some of the top teeth and the bottom teeth are arranged in an arc pattern.

Other aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors or owners reserve all rights that they may have in any invention disclosed in an apparatus or process described below that is not claimed in this document, for example the right to claim such an invention in a continuing application and do not intend to abandon, disclaim or dedicate to the public any such invention by its disclosure in this document.

Figure 1:
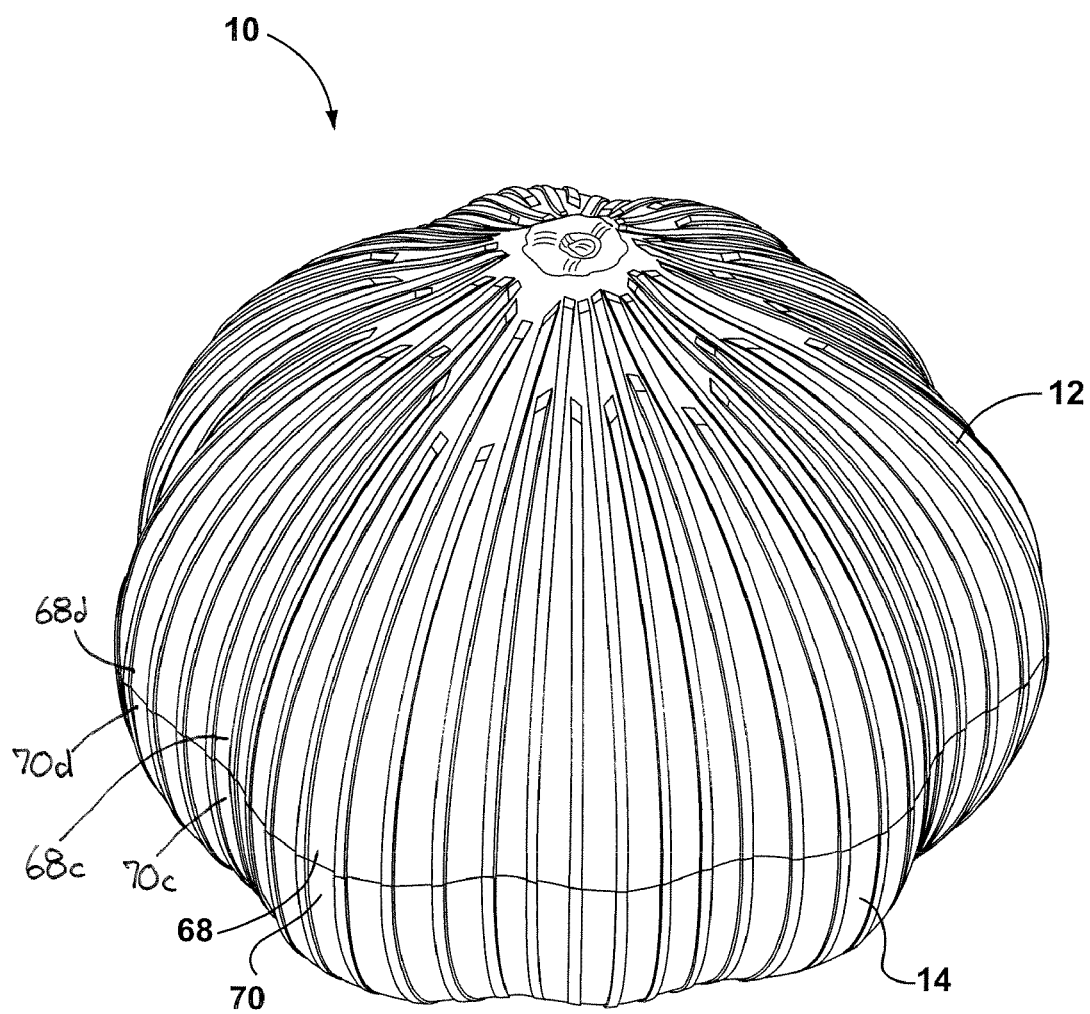
FIG. 1 is an upper perspective view of a food grinder with top and bottom parts in a closed, coupled position.
Figure 2:
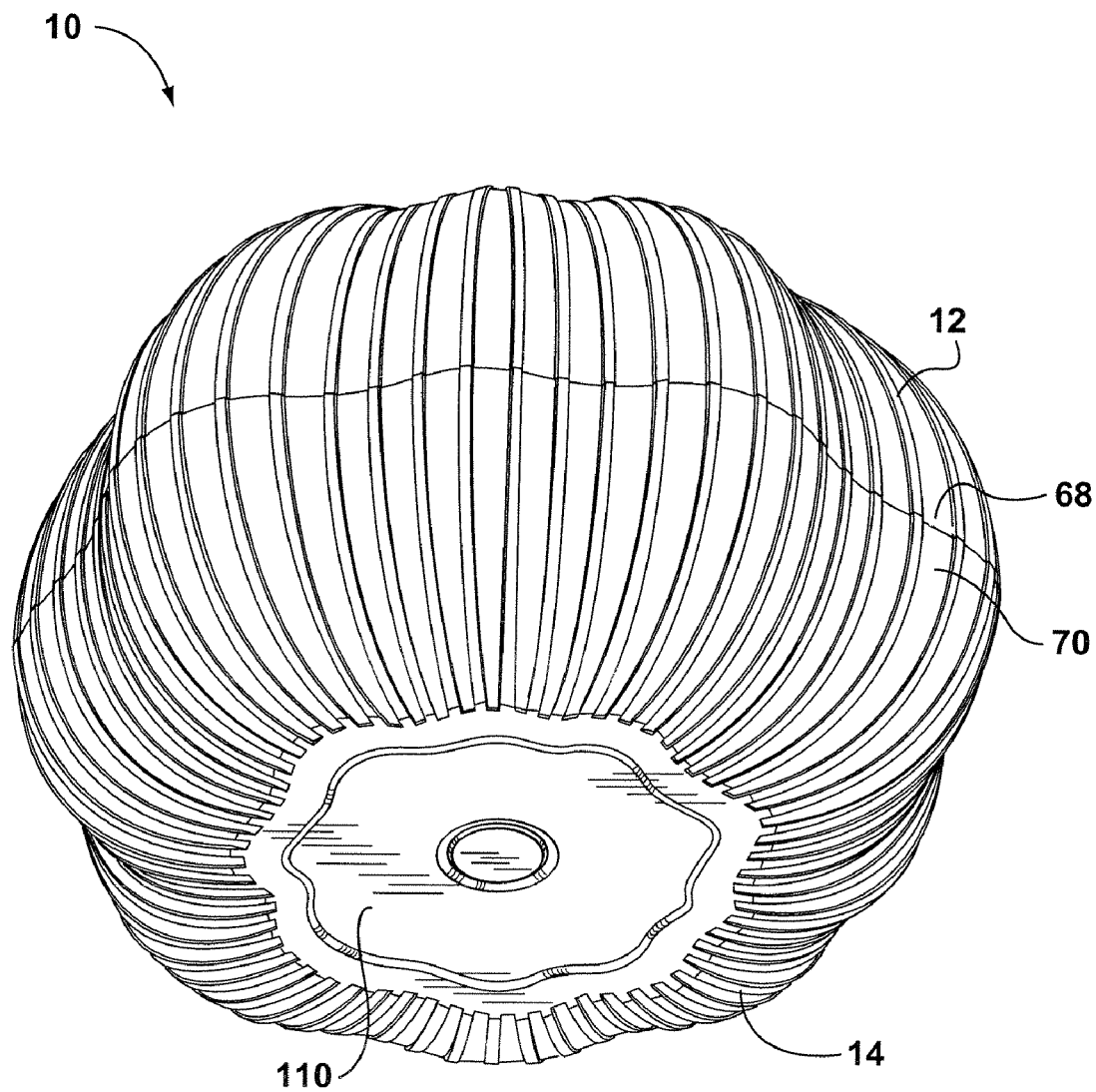
FIG. 2 is a lower perspective view of the food grinder of FIG. 1.
Figure 3:
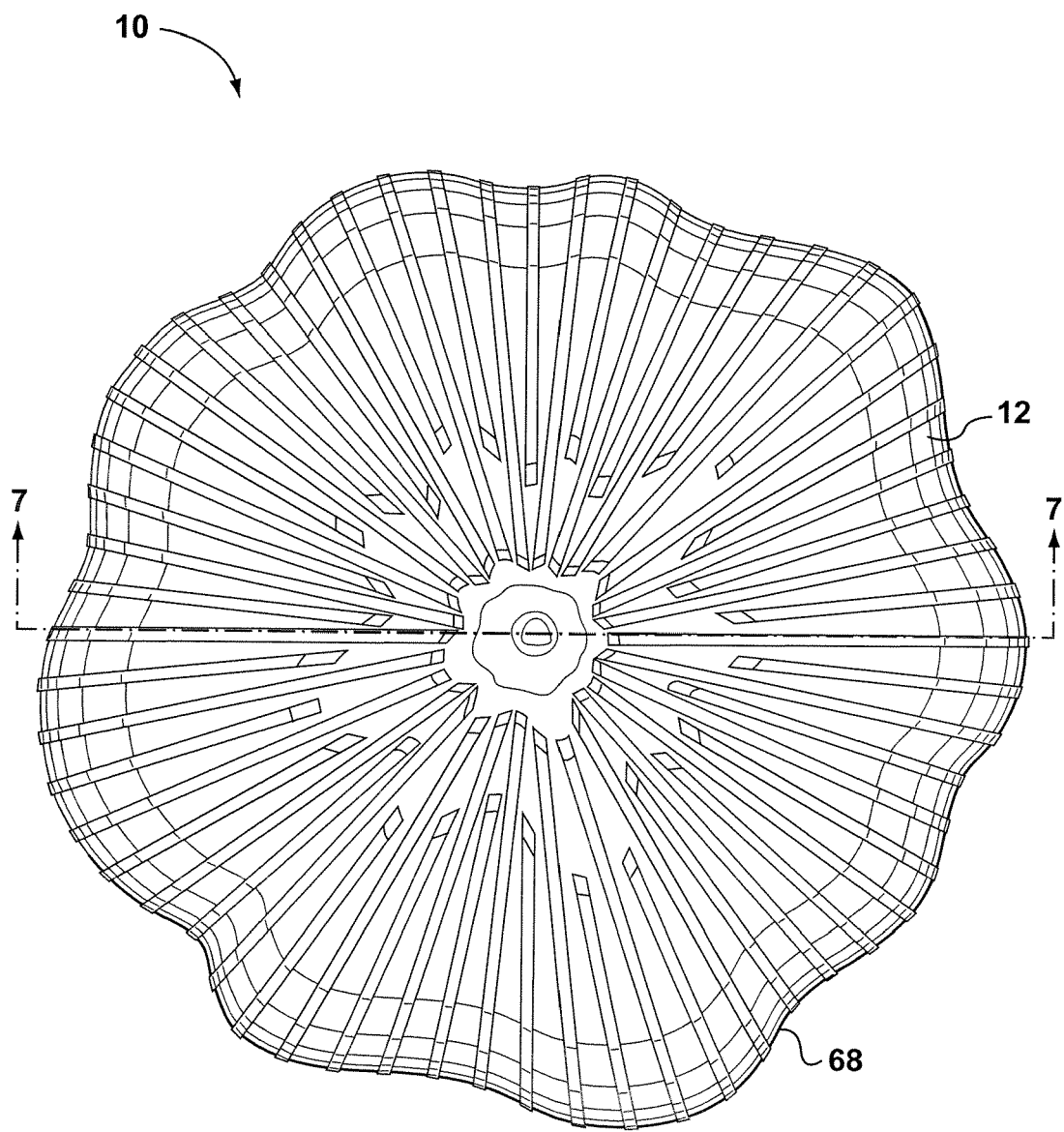
FIG. 3 is a top plan view of the food grinder of FIG. 1.

Referring to FIGS. 1 to 3, a food grinder 10 according to one example includes a top shell 12 or first body portion and a bottom shell 14 or second body portion. The top and bottom shells 12, 14 are generally configured to be releasably coupled together and to receive a food item 33 (e.g. one or more cloves of garlic) therein for grinding, by rotating the top and bottom shells 12, 14 relative to each other when coupled, as described in greater detail below.

Figure 4:
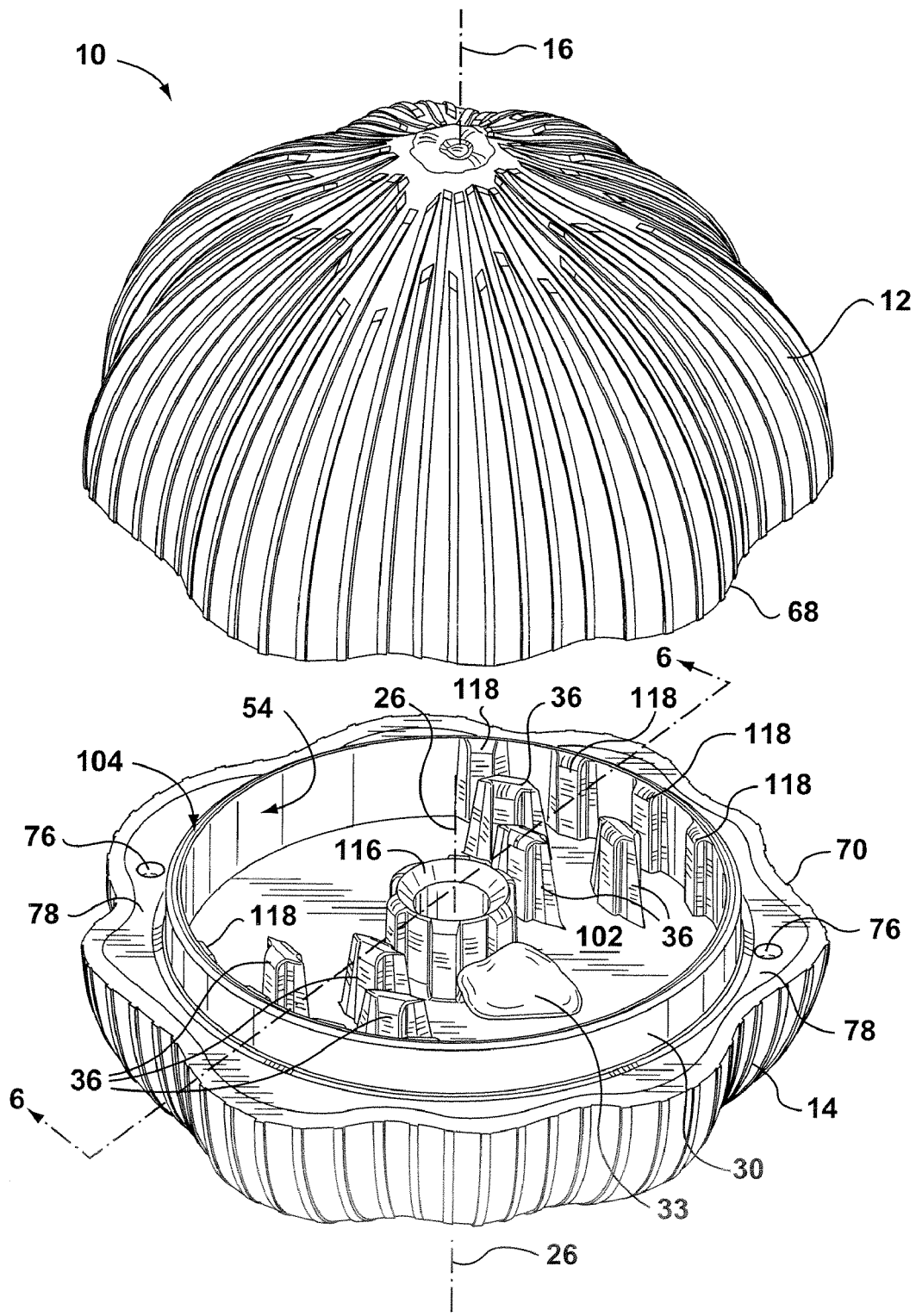
FIG. 4 is an upper perspective view of the food grinder of FIG. 1 with top and bottom parts spaced apart from each other.
Figure 5:
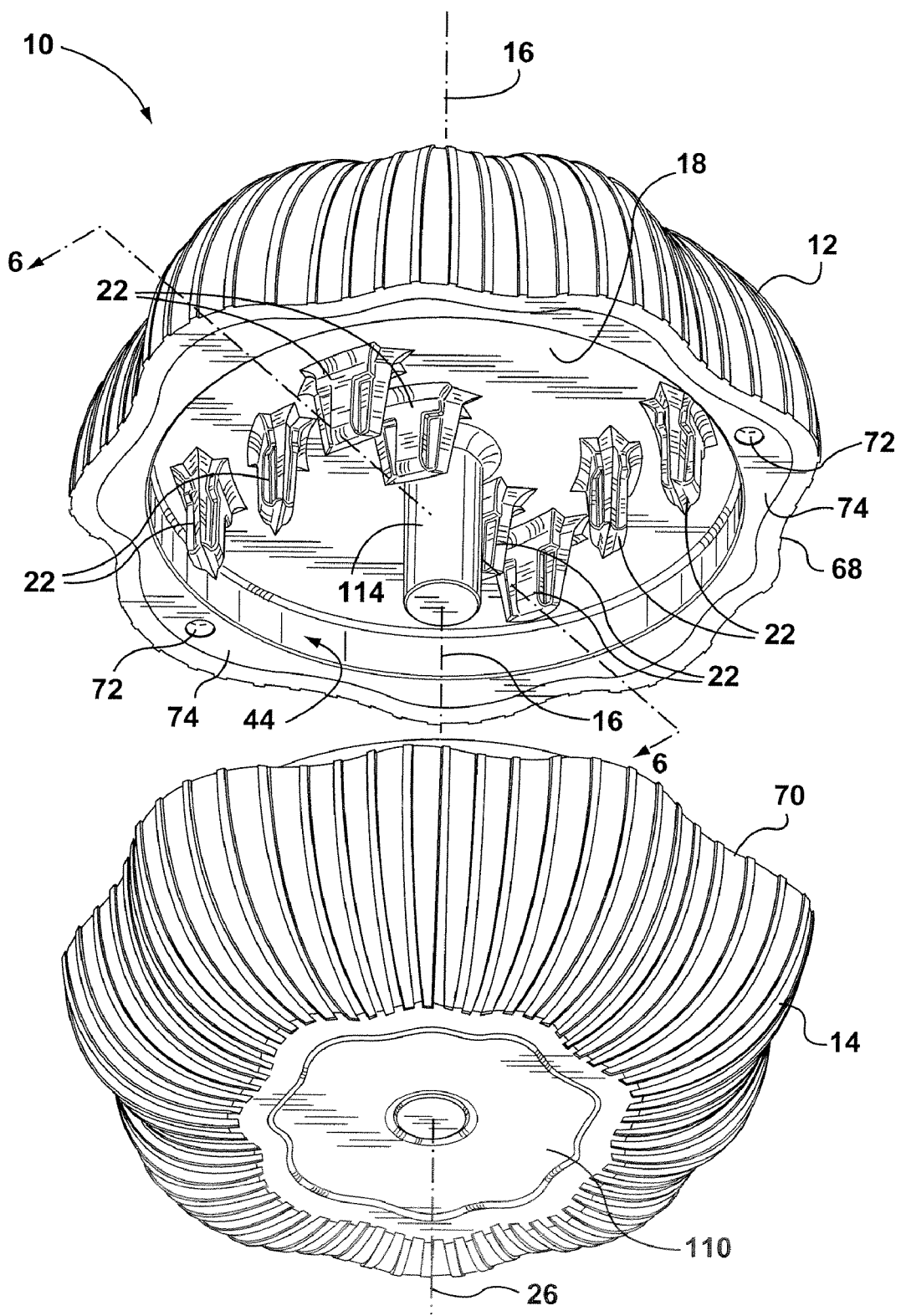
FIG. 5 is a lower perspective view of the food grinder of FIG. 1 with top and bottom parts spaced apart from each other.
Figure 6:
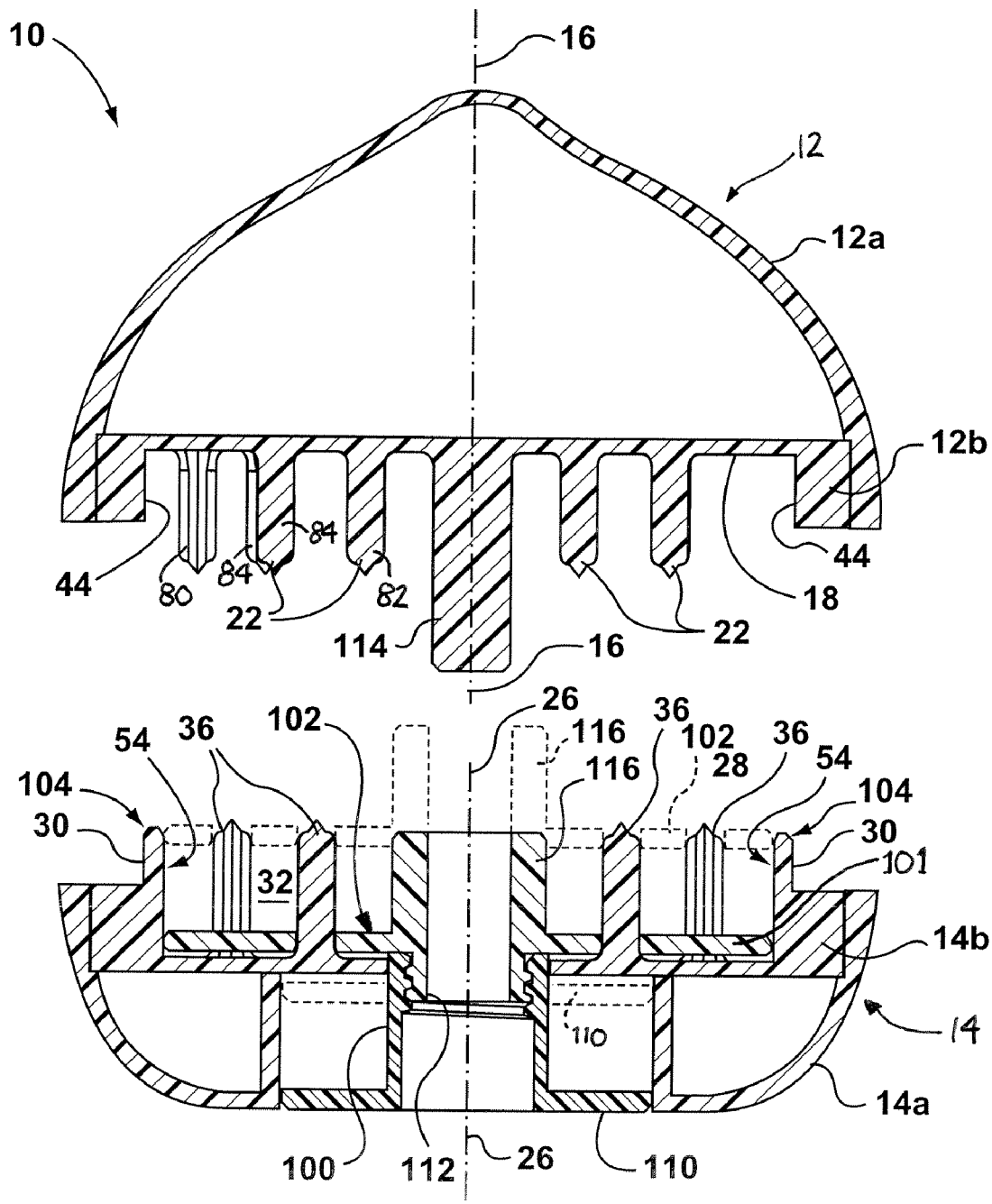
FIG. 6 is a cross sectional elevation view of the food grinder of FIG. 1 taken through lines 6-6 in FIGS. 4 and 5 with top and bottom parts spaced apart.

The top shell 12 may have a top axis 16 (referring to in FIGS. 4 to 6) provided generally centrally to the top shell 12, and a top inner surface 18 generally disposed about the top axis 16. The top shell 12 may comprise a top casing 12a of generally hemispherical shape, having a generally convex outer surface and an open lower end. The top shell 12 may also comprise a top insert 12b that is generally disc-shaped and which may be fixed in the open lower end of the top casing 12a. The top inner surface 18 may comprise a lower outer surface of the insert 12b.

Figure 10:
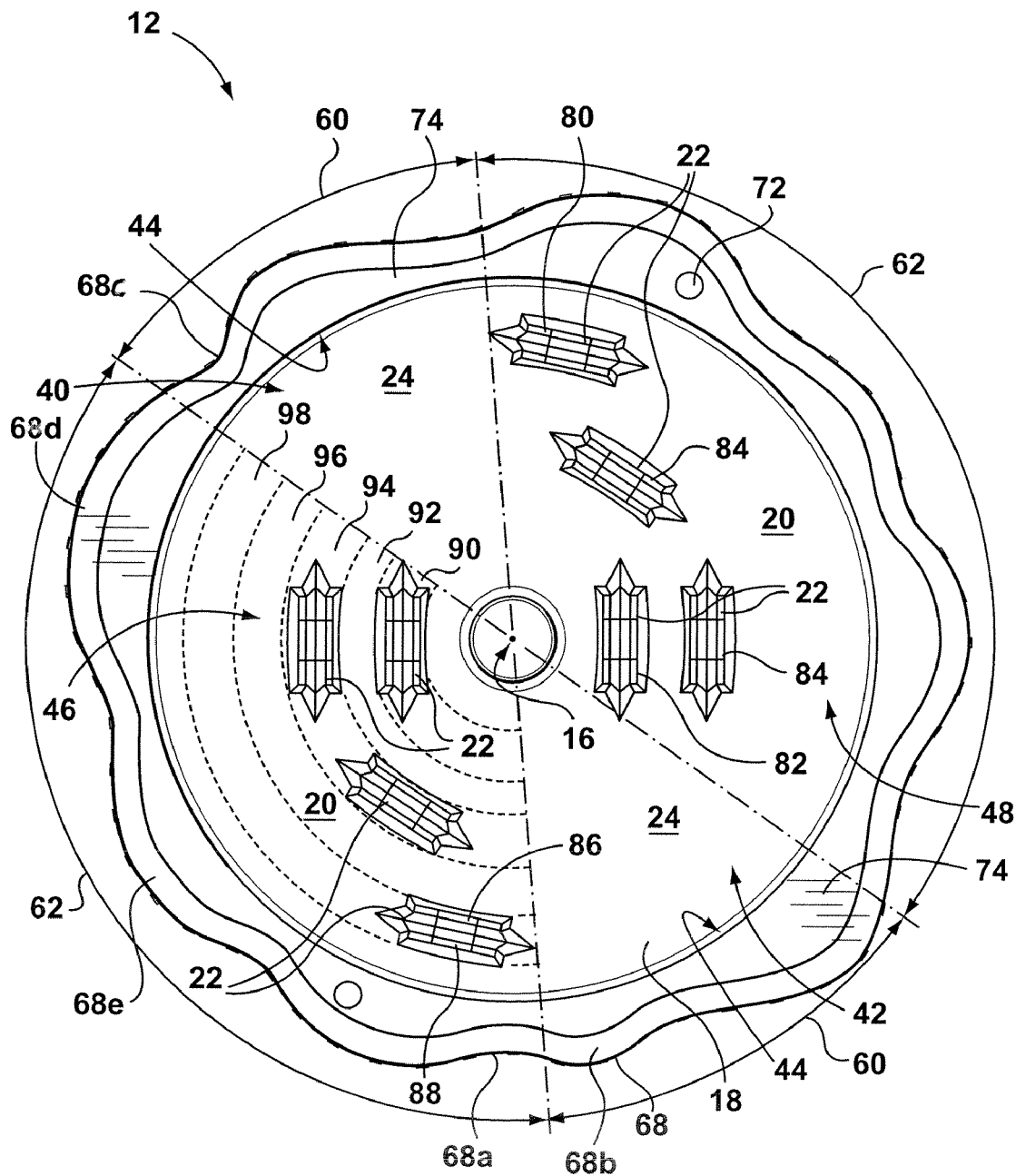
FIG. 10 is a bottom view of a top part of the food grinder of FIG. 1.
Figure 11:
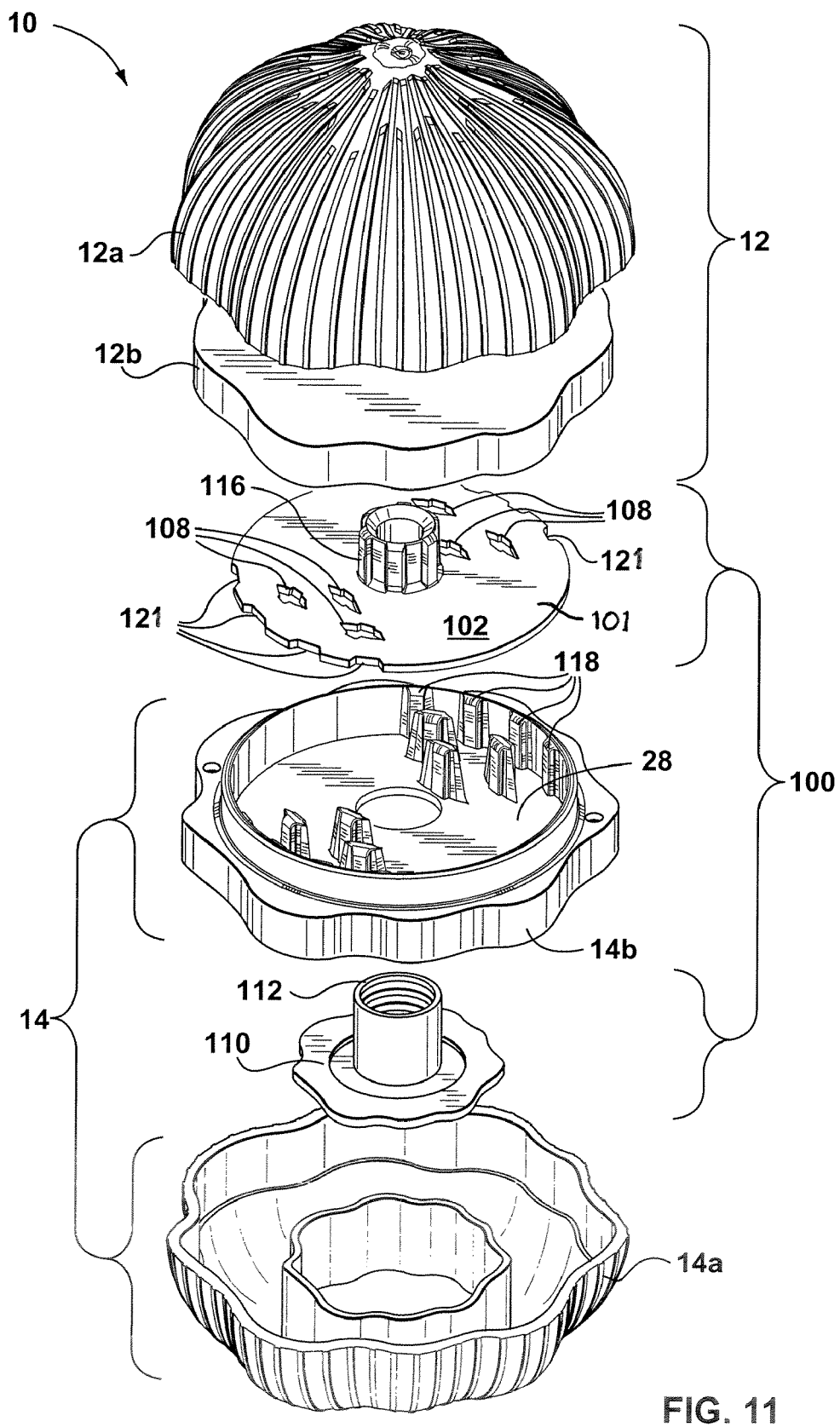
FIG. 11 is an exploded perspective view of the food grinder of FIG. 1.

Referring to FIG. 10, the top inner surface 18 may include a top toothed region 20 that includes a plurality of top teeth 22. The top teeth 22 may extend generally downwardly from the top inner surface 18 and be configured to cooperate with corresponding bottom teeth to grind or chop the food item 33. The top inner surface 18 may also include a top non-toothed region 24 that is substantially free of top teeth 22.

The bottom shell 14 may include a bottom axis 26 positioned generally centrally to the bottom shell 14, and a bottom inner surface 28 generally disposed about the bottom axis 26. The bottom shell 14 may comprise a bottom casing 14a of generally hemispherical shape, having a generally convex outer lower surface and an open upper end. The bottom shell 14 may also comprise a bottom insert 14b that is generally disc-shaped and which may be fixed in the open upper end of the bottom casing 14a. The bottom inner surface 28 can comprise an upper outer surface of the insert 14b.

The bottom shell 14 may also include a peripheral upstanding sidewall 30 that extends upwardly from the bottom inner surface 28 generally around the perimeter of the bottom inner surface 28. The sidewall 30 can at least partially define a cavity 32 or recessed portion for receiving and containing the food item 33.

The bottom shell 14 is generally movable relative to the top shell 12 between a first position or open position in which the bottom shell 14 is spaced apart from the top shell 12 (referring to FIGS. 4 to 6, for example), and a second or closed position in which the top shell 12 and bottom shell 14 are coupled together and may be rotated to effect grinding of the food item 33 (referring to FIGS. 1 to 3, and 7, for example).

Figure 9:
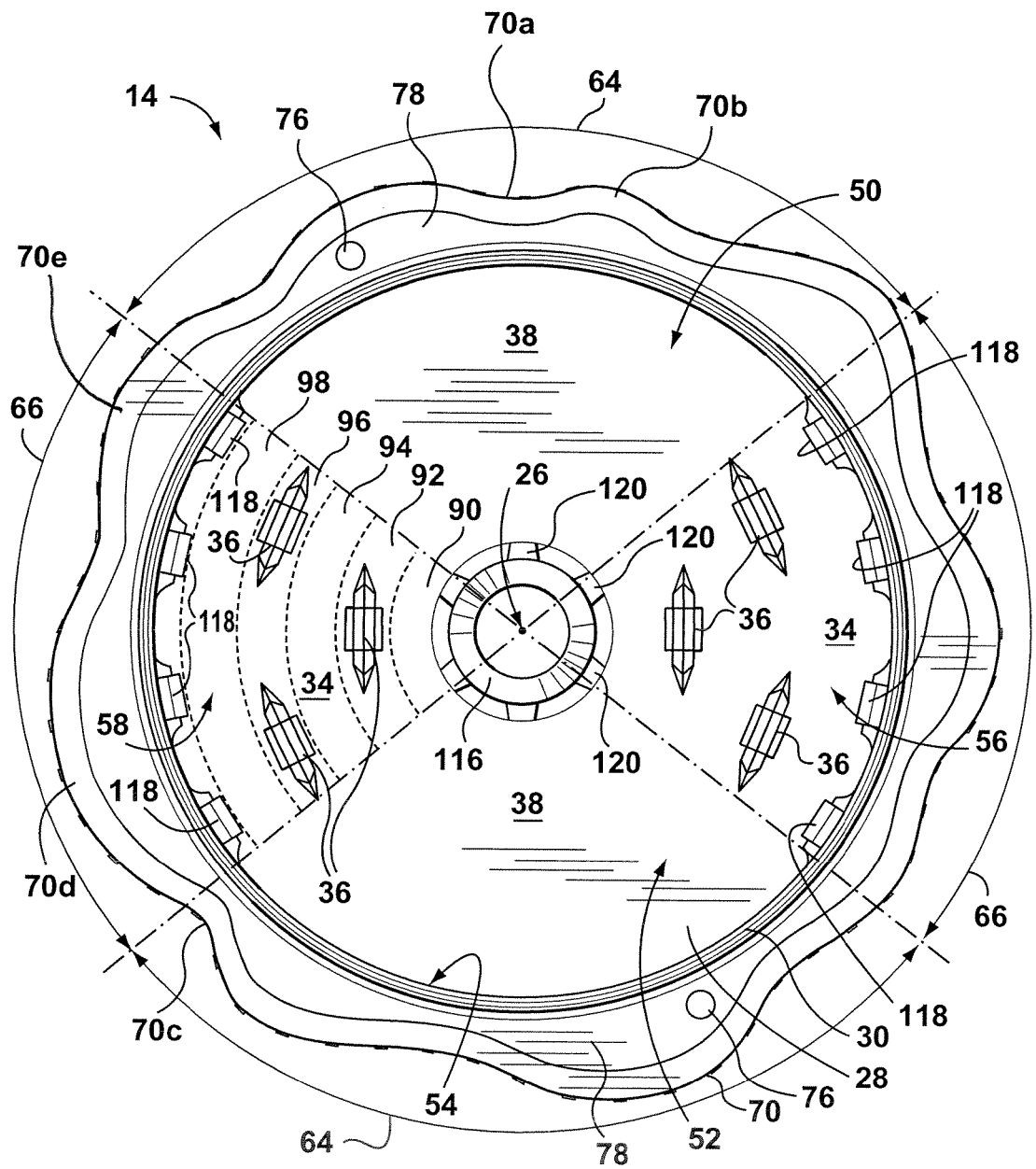
FIG. 9 is a top view of a bottom part of the food grinder of FIG. 1.

Referring to FIG. 9, the bottom inner surface 28 may include a bottom toothed region 34 having a plurality of bottom teeth 36 that extend upwardly from the bottom inner surface 28. The bottom inner surface 28 may also include a bottom non-toothed region 38 that is substantially free of bottom teeth 36.

The top and bottom shells 12, 14 are generally configured to be coupled together with the top axis 16 and the bottom axis 26 being generally collinear to define a rotation axis 40 about which the top and bottom shells 12, 14 may be rotated relative to each other.

In some examples the top non-toothed region 24 and the bottom non-toothed region 38 may be configured to at least partially align in vertical registration when the top shell 12 and bottom shell 14 are coupled together. For example, the food item 33 may be received in the bottom non-toothed region 38 (referring to FIG. 4), and then the top non-toothed region 24 aligned with the bottom non-toothed region 38 during coupling of the top and bottom shells 12, 14. This may facilitate coupling the top and bottom shells 12, 14 by reducing interference of the food item 33 and the top teeth 22 (for example) during coupling, which may be undesirable.

The top and bottom shells 12, 14 may be provided with one or more alignment indicators to provide a visual, tactile, or other indication corresponding to a relative rotational position of the top shell 12 with respect to the bottom shell 14 in which the top and bottom non-toothed regions 24, 38 are in substantial vertical registration. Such rotational alignment defines a registration position, as discussed further below.

Figure 7:
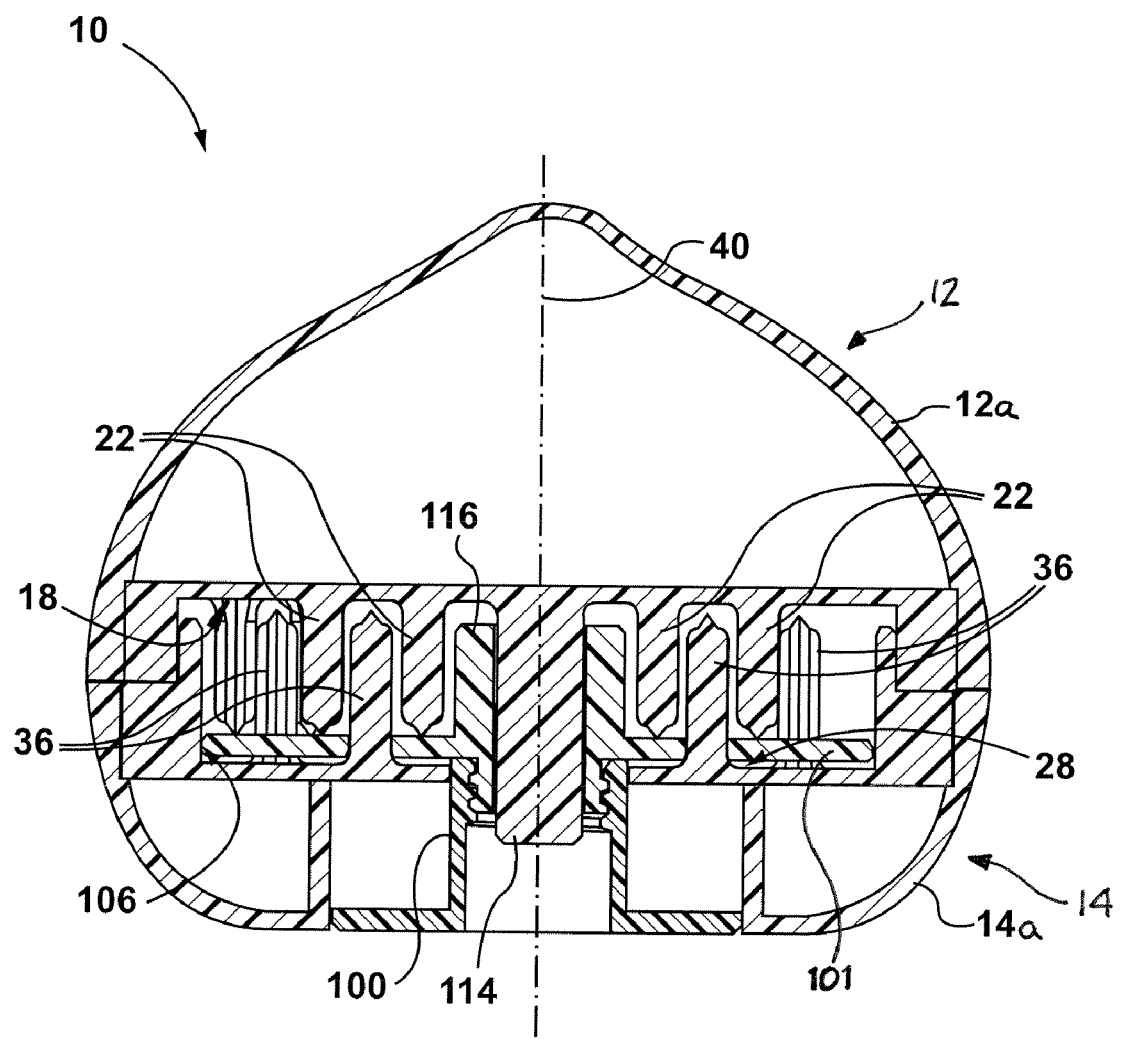
FIG. 7 is another cross sectional elevation view of the food grinder of FIG. 1 taken through line 7-7 in FIG. 3 with top and bottom parts coupled together.
Figure 8:
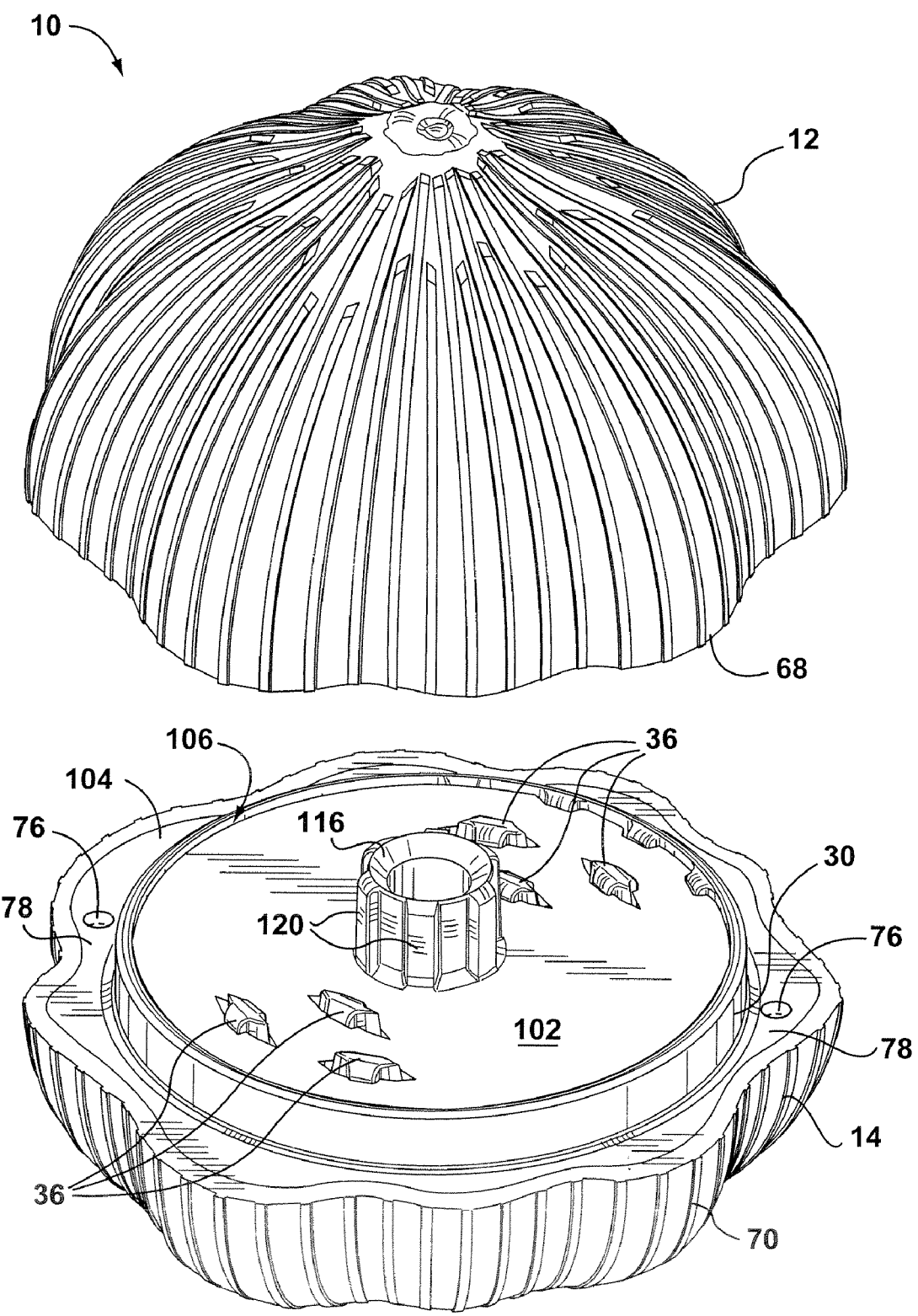
FIG. 8 is an upper perspective view of the food grinder of FIG. 1, showing a plunger member disposed towards or in an advanced position.

Referring to FIG. 7, the top teeth 22 and the bottom teeth 36 are configured to interlace or interdigitate with one another when the top and bottom shells 12, 14 are coupled together and rotated. This interlacing tends to chop or grind the food item 33 between the top teeth 22 and the bottom teeth 36.

In some examples, the top non-toothed region 24 includes one or more top non-toothed sectors 40, 42 that each extend radially from the top axis 16 to an outer periphery 44 of the top inner surface 18. In some examples, the top toothed region 20 includes one or more top toothed sectors 46, 48 that each extend radially from the top axis 16 to the outer periphery 44 of the top inner surface 18.

Similarly, in some examples, the bottom non-toothed region 38 includes one or more bottom non-toothed sectors 50, 52 that each extend radially from the bottom axis 26 to an outer periphery 54 of the bottom inner surface 28 (generally adjacent the sidewall 30). In some examples, the bottom toothed region 34 includes one or more bottom toothed sectors 56, 58 that each extend radially from the bottom axis 26 to the outer periphery 54 of the bottom inner surface 28.

In some examples, the top non-toothed sectors 40, 42 span a first top angle 60, while the top tooth sectors 46, 48 span a second top angle 62. In some examples, the bottom non-tooth sectors 50, 52 span a first bottom angle 64, while the bottom tooth sectors 56, 58 span a second bottom angle 66. In some examples, the first top angle 60 is at least 45 degrees. In some examples, the first bottom angle 64 is at least 45 degrees. In some examples, the first bottom angle 64 is at least 90 degrees.

In some examples, the top and bottom shells 12, 14 may include one or more alignment indicators that indicate when the top non-toothed region 24 and the bottom non-toothed region 38 are at least partially aligned in vertical registration (i.e. when the top and bottom shells 12, 14 are in a registration position). For instance, in some examples the top shell 12 may have a top asymmetric profile 68 and the bottom shell 14 may have a bottom asymmetric profile 70 generally corresponding to the top asymmetric profile 68. The asymmetric profiles 68, 70 may cooperate to function as an alignment indicator, with the top non-toothed region 24 and the bottom non-toothed region 38 being at least partially aligned in vertical registration when the top and bottom asymmetric profiles 68, 70 are aligned (referring to FIGS. 1 and 2).

In some examples, the first top angle 60 is smaller than the first bottom angle, and the top non-toothed sectors 40, 42 are smaller than the bottom non-toothed sectors 50, 52. In such examples, the top non-toothed region 24 and the bottom non-toothed region 38 may be at least partially aligned when the top non-toothed sectors 40, 42 are entirely within the bottom non-toothed sectors 50, 52.

In the example illustrated, the top asymmetric profile 68 (referring to FIG. 10) of the top shell 12 includes a series of alternating ridges and valleys corresponding to increased and decreased radial dimensions of the outer surface of the top shell. For example, the top toothed sector 46 extends circumferentially generally between a first valley 68a (adjacent a small first ridge 68b) to a second valley 68c (adjacent a broad second ridge 68d), and includes an additional broad ridge 68e.

Similarly, the bottom toothed sector 58 extends circumferentially generally between a small valley 70c and two broad ridges 70d, 70e, while the bottom non-toothed sector 50 includes a ridge 70b and a valley 70a.

In the example illustrated, the ridges and valleys on the top shell 12 and bottom shell 14 may be aligned during coupling to align the top non-toothed sectors 40, 42 with the bottom non-toothed sectors 50, 52. For example, valley 68a could be aligned with valley 70a, ridge 68b could be aligned with ridge 70b, valley 68c could be aligned with valley 70c, and ridges 68d and 68e could be aligned with ridges 70d and 70e, respectively.

In some examples, then the top shell 12 and bottom shell 14 are oriented so that top ridges and valleys 68a, 68b, 68c, 68d, and 68e are aligned with the bottom ridges and valleys 70a, 70b, 70c, 70d, and 70e, the top shell 12 and bottom shell 14 are axially aligned, and may be coupled by displacing the top shell 12 and bottom shell 14 axially towards each other.

In some examples, the alignment indicators include top magnets 72 provided in an outer engagement surface 74 of the top shell 12, and corresponding bottom magnets 76 in an outer engagement surface 78 of the bottom shell 14. The top magnets 72 and bottom magnets 76 may be configured such that the top non-toothed region 24 and the bottom non-toothed region 38 are at least partially aligned in vertical registration when the outer engagement surfaces 74, 78 are engaged with each other and the top magnets 72 and bottom magnets 76 are aligned in a predetermined or "correct" contact configuration.

In some examples, at least one of the top teeth 22 and the bottom teeth 36 are arranged in one or more irregular or non-linear patterns or arrangements. For example, referring to FIG. 10, the top teeth 22 may be arranged in a general arc pattern having a leading tooth 80 and a trailing tooth 82.

In some examples, the leading tooth 80 and the trailing tooth 82 may be circumferentially and radially spaced from each other, with the leading tooth 80 nearer the periphery 44 of the top inner surface 18 and the trailing tooth 82 nearer the top axis 16. In some examples, as the top shell 12 is rotated with respect to the bottom shell 14, the leading tooth 80 will be the first tooth that engages with the food item 33 in the cavity 32. In some examples, the arc pattern may include one or more middle teeth 84 circumferentially and radially spaced from one or both the leading tooth 80 and the trailing tooth 82.

In some examples, the leading tooth 80 has a leading edge 80a that is circumferentially distal the trailing tooth 82, while the trailing tooth has a trailing edge 82a circumferentially distal the leading tooth 80.

In some examples, the top tooth sectors 46, 48 may be defined by rays that extend radially outwardly from the top axis and engage with the leading and trailing edge of the top teeth 22. For example, referring to FIG. 12, the top tooth sector 46 may be defined by a first ray 46a that extends radially outwardly from the top axis 16 and passes through the leading edge 80a of the leading tooth 80, and a second ray 46b that extends radially outwardly from the top axis 16 and passes through the trailing edge 82a of the trailing tooth 82. In some examples, the top toothed sector 46 includes at least one middle tooth 84 disposed between the leading tooth 80 and the trailing tooth 82. In some examples, at least one middle tooth 84 is circumferentially and radially offset from both the leading tooth 80 and the trailing tooth 82. Each middle tooth 84 may also include end edges 84a, 84b that are spaced apart from each ray 46a, 46b.

In some examples, the top teeth 22 may be arranged in two arc patterns and define a generally s-shaped pattern, referring to FIG. 10. In some examples the bottom teeth 36 may be arranged in one or more triangular patterns with an inner tooth 37 and one or more outer teeth 39, referring to FIG. 9. In some examples, the outer teeth 39 may be radially aligned with each other, and circumferentially spaced from each other, but radially spaced from the inner tooth 37.

The irregular or non-linear patterns or arrangements of the top teeth 22 and/or the bottom teeth 36 may tend to reduce slip-though of portions of the food item 33 during grinding. In some examples, the top teeth 22 and bottom teeth 36 may each be of the same or a similar size and shape. In other examples, the top teeth 22 and the bottom teeth may be different sizes and/or may have different shapes.

Figure 12:
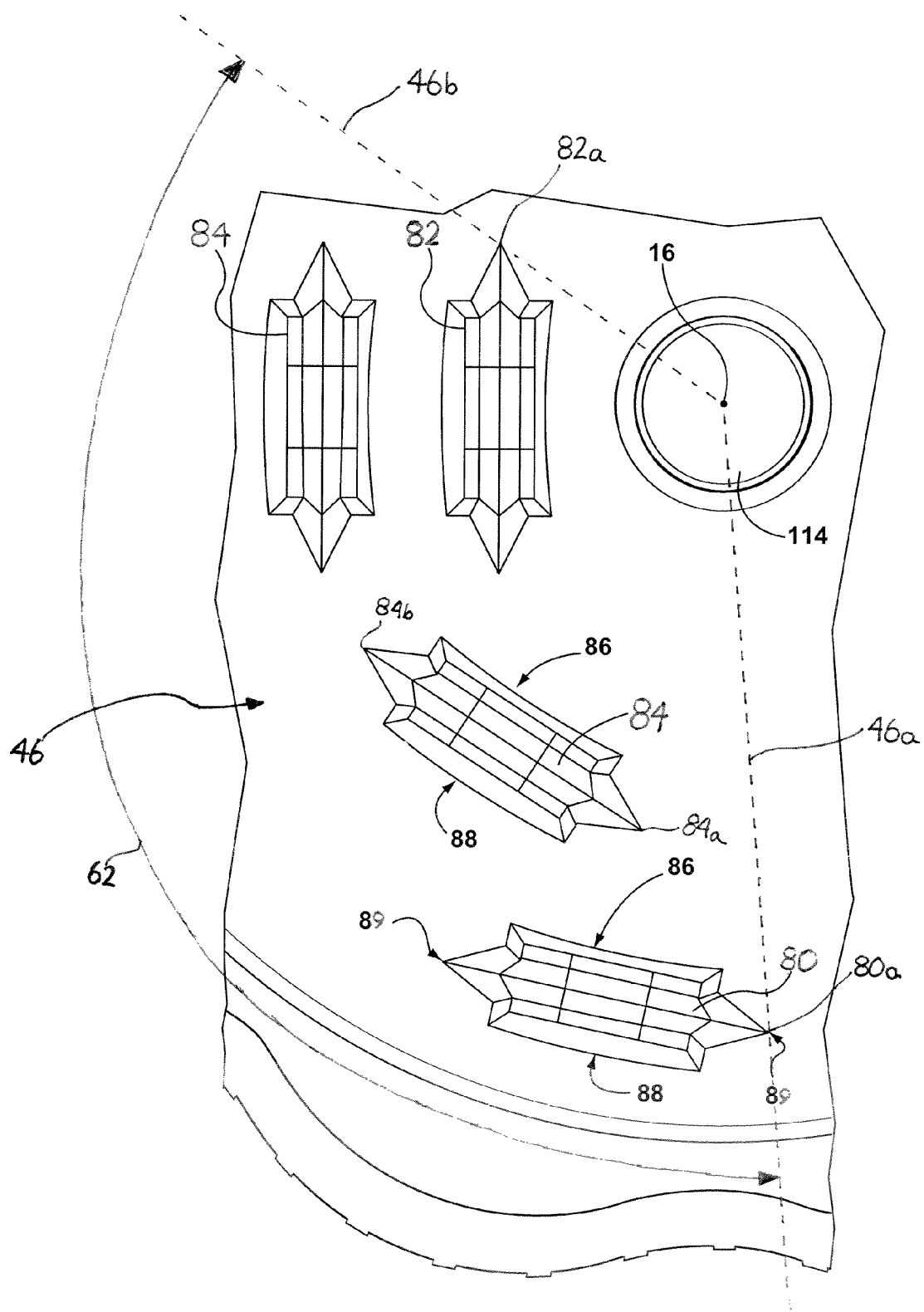
FIG. 12 is an enlarged view of a portion of the top part of FIG. 10.

In some examples, at least some of the top teeth 22 and bottom teeth 36 have radial inner surfaces 86 and radial outer surfaces 88 that extend in a generally circumferential direction, referring to FIG. 12. The radial inner surfaces 86 and radial outer surfaces 88 of the teeth 22 may converge to define cutting edges 89 or blades that may tend to facilitate chopping or grinding of the food item 33. In some examples, the radial outer surface 88 may be generally convex, and the radial inner surface 86 may be generally concave.

In some examples, when the top and bottom shells 12, 14 are coupled together, the bottom teeth 36 may extend upward adjacent the top inner surface 18 and the top teeth 22 may extend downward adjacent the bottom inner surface 28, referring to FIG. 7. This may tend to inhibit movement of the food item 33 between the bottom teeth 36 and the top inner surface 18, and between the top teeth 22 and the bottom inner surface 28, which may be undesirable and may inhibit grinding of the food item 33.

In some examples, the top teeth 22 and bottom teeth 36 define lanes that substantially occupy a radial distance between the rotation axis 40 and the sidewall 30 when the top and bottom shells 12, 14 are coupled together. For example, five concentric lanes 90, 92, 94, 96 and 98 may be defined (referring to FIGS. 9 and 10), with the top teeth 22 provided in lanes 90, 94 and 98 and the bottom teeth 36 provided in lanes 92 and 96. During rotation, the top teeth 22 move within the lanes 90, 94 and 98 as the bottom teeth 36 move within the lanes 92 and 96, occupying substantially all of the radial distance within the cavity 32 and thus grinding or chopping the food item 33.

In some examples, the grinder 10 further includes a plunger 100 provided in one or both of the top shell 12 and bottom shell 14. In the example illustrated, the plunger 100 is provided within the bottom shell 14. The plunger 100 may include a plunger plate 101 that is generally movable or slidable within the cavity 32 between a retracted position (referring to FIG. 4) and an advanced position (in phantom in FIG. 6). The plunger plate 101 includes an upper surface 102.

In some examples, the plunger plate 101 may be axially displaced between 10 and 15 mm within the cavity 32.

In the retracted position, the upper surface 102 of the plunger 100 may be positioned generally below (or axially set back from) an upper edge 104 of the sidewall 30, such that the food item 33 may be received in the cavity 32. In the advanced position, the upper surface 102 of the plunger 100 may be generally adjacent or flush with the upper edge 104 of the sidewall 30, such that the food item 33 may be pushed out or ejected from the cavity 32.

In some examples, a gap 106 between a peripheral edge of the upper surface 102 of the plunger 100 and the sidewall 30 is minimal. This may tend to facilitate removal of the food item 33 the cavity 32 and to inhibit the food item 33 from becoming lodged between the upper surface 102 and the bottom inner surface 28.

In some examples, the upper surface 102 has apertures 108 therein for slidably receiving the bottom teeth 36 as the plunger 100 moves between the retracted position and the advanced position.

In some examples, the plunger 100 further includes an actuator 110 provided in the bottom shell 14. The actuator 110 may be coupled to the plunger plate 101 for moving the plunger 100 between the retracted and advanced positions. In some examples, the actuator 110 and the plunger plate 101 may be coupled together by threaded portions 112, which may allow the plunger plate 101 to be removed, for example for cleaning. The actuator 110 may act as a hard stop and inhibit movement of the plunger 100 beyond a predetermined limit. For example, an upper surface of the actuator 110 may engage the bottom shell 14 to inhibit movement of the upper surface 102 of the plunger 104 substantially beyond the upper edge 104 of the sidewall 30.

In some examples, the top shell 12 may include a guide post 114 extending downwardly from the top inner surface 18. The plunger 100 may include a corresponding hub 116 provided in the plunger plate 101, the hub 116 configured to receive the guide post 114 (referring to FIG. 7). The hub 116 and guide post 114 may tend to cooperate to assist in guiding the top and bottom shells 12, 14 together during coupling.

In some examples, the sidewall 30 may include secondary or half-teeth 118. The half-teeth 118 may tend to further assist in the grinding or chopping of the food item 33 between the top teeth 22 and the bottom teeth 36. In some examples, the half-teeth 118 may serve as guide rails and cooperate with one or more guide portions 121 in the plunger plate 101 of the plunger 100, and may assist in guiding the movement of the plunger 100 within the cavity 32.

In some examples, the hub 116 may also include secondary or half-teeth 120 provided on the outer surface thereof.

In some examples the food grinder 10 may include one or more light transmitting regions. For example, one or more components of the food grinder may be translucent and/or transparent. In some examples, the food grinder 10 may be at least partially solid or opaque.

In some examples the food grinder 10 may be made of a plastic. In some examples, the food grinder 10 may be made of a metal. In some examples, the food grinder 10 may be made of a glass or ceramic.

In some examples, the plunger 100 may be biased towards the retracted position. For example, the plunger 100 may include a spring or other biasing mechanism therewith.

For greater clarity, terms such as "top", "bottom", "upward" and "downward" as used herein are generally used for convenience only, and are specifically not meant to be limiting. For example, it is specifically contemplated that the top shell 12 and bottom shell 14 could be used in an inverted position from the one as described herein, with the bottom shell 14 provided above the top shell 12.

During use according to some examples, the food item 33 is placed into the bottom non-toothed region 38, generally within the cavity 32 of the bottom shell 14, when the top shell 12 and bottom shell 14 are apart. The top shell 12 and bottom shell 14 may then be coupled together, with the top non-toothed region 24 at least partially aligned with the bottom non-toothed region 38 during coupling in some examples so as to inhibit or reduce interference with the food item 33 between the top teeth 22 and the bottom inner surface 28. This may be facilitated by alignment indicators as generally described above.

Once the top shell 12 and the bottom shell 14 are coupled, the top shell 12 and bottom shell 14 may be rotated relative to each other. During rotation, the top teeth 22 and the bottom teeth 36 will tend to engage with the food item 33 in the cavity 32, grinding or chopping the food item 33. In some examples, the irregular arrangement of the top teeth 22 and/or the bottom teeth 36 may tend to reduce slippage of a food item 33 (e.g. chunks of garlic clove) between the teeth 22, 36 and tend to facilitated chopping or grinding. For example, the leading tooth 80 may engage a portion of the food item 33 first, and may push or "wipe" at least a portion of the food item 33 inwardly towards the rotation axis 40. This may tend to concentrate the food item 33 within a particular area or region within the cavity 32, and may facilitate grinding or chopping.

Once the food item 33 has been ground or chopped as desired, the top shell 12 and the bottom shell 14 may then be separated and the food item 33 may be removed from the cavity 32. In some examples, the food item 33 may be scooped from the cavity using a spoon, a finger or any other suitable device. In other examples, for example where the food grinder includes a plunger 100, the food item 33 may be ejected or pushed from the cavity 32 using the plunger 100. The food grinder 10 may then be cleaned for subsequent use.

In some examples, the top shell 12 and bottom shell 14 may be configured to have an exterior shape that corresponds to the shape of a food product, which may be the same as or different from the foot item. For example, the top shell 12 and bottom shell 14 may have an exterior shape that corresponds to a clove of garlic.

In some examples the top teeth 22 and the bottom teeth 36 may be permanently fixed to the top shell 12 and the bottom shell 14, respectively. In other examples, the top teeth 22 and bottom teeth 36 may be removable.

Figure 13:
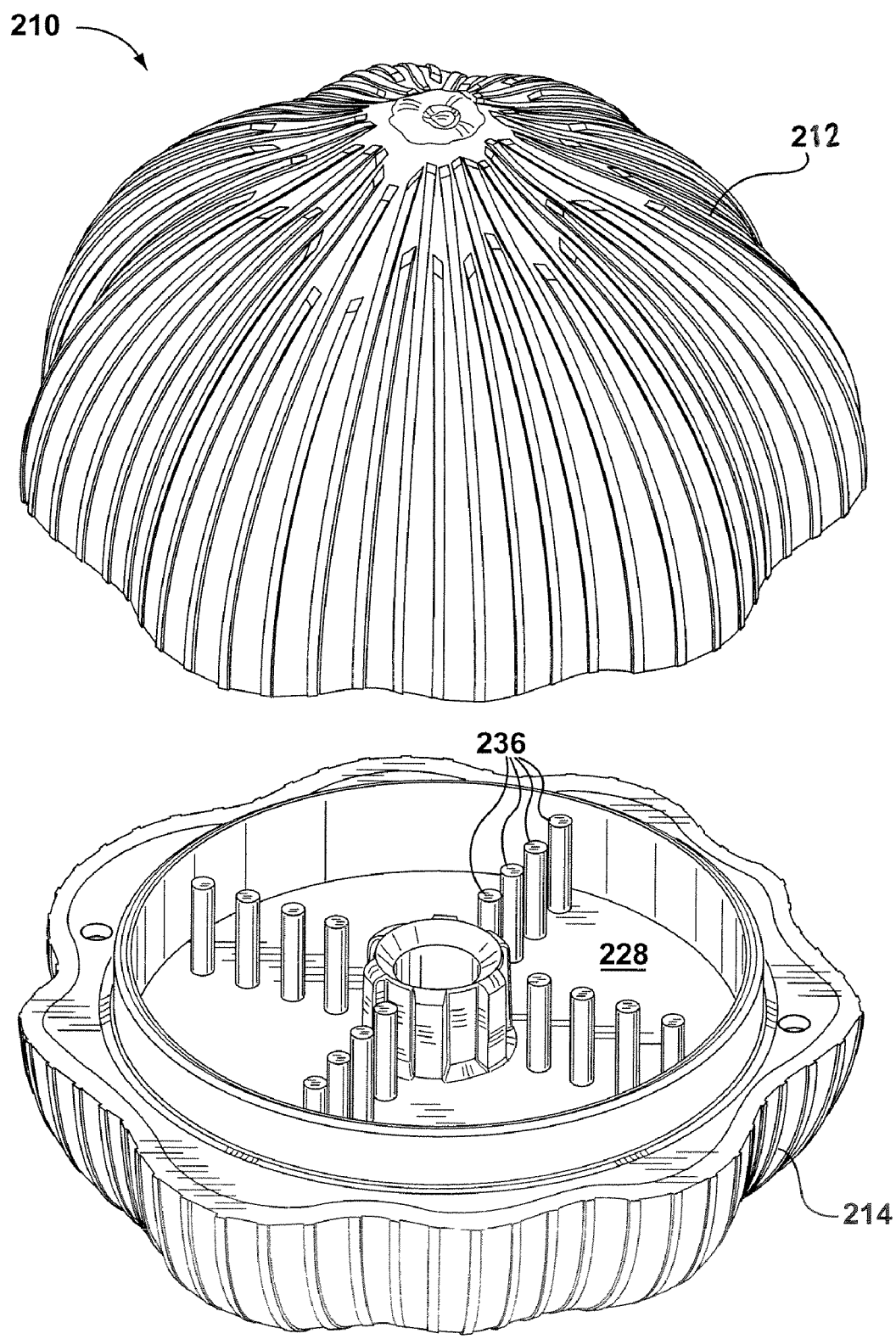
FIG. 13 is an upper perspective view of another example of a food grinder with upper and lower parts spaced apart from each other.
Figure 14:
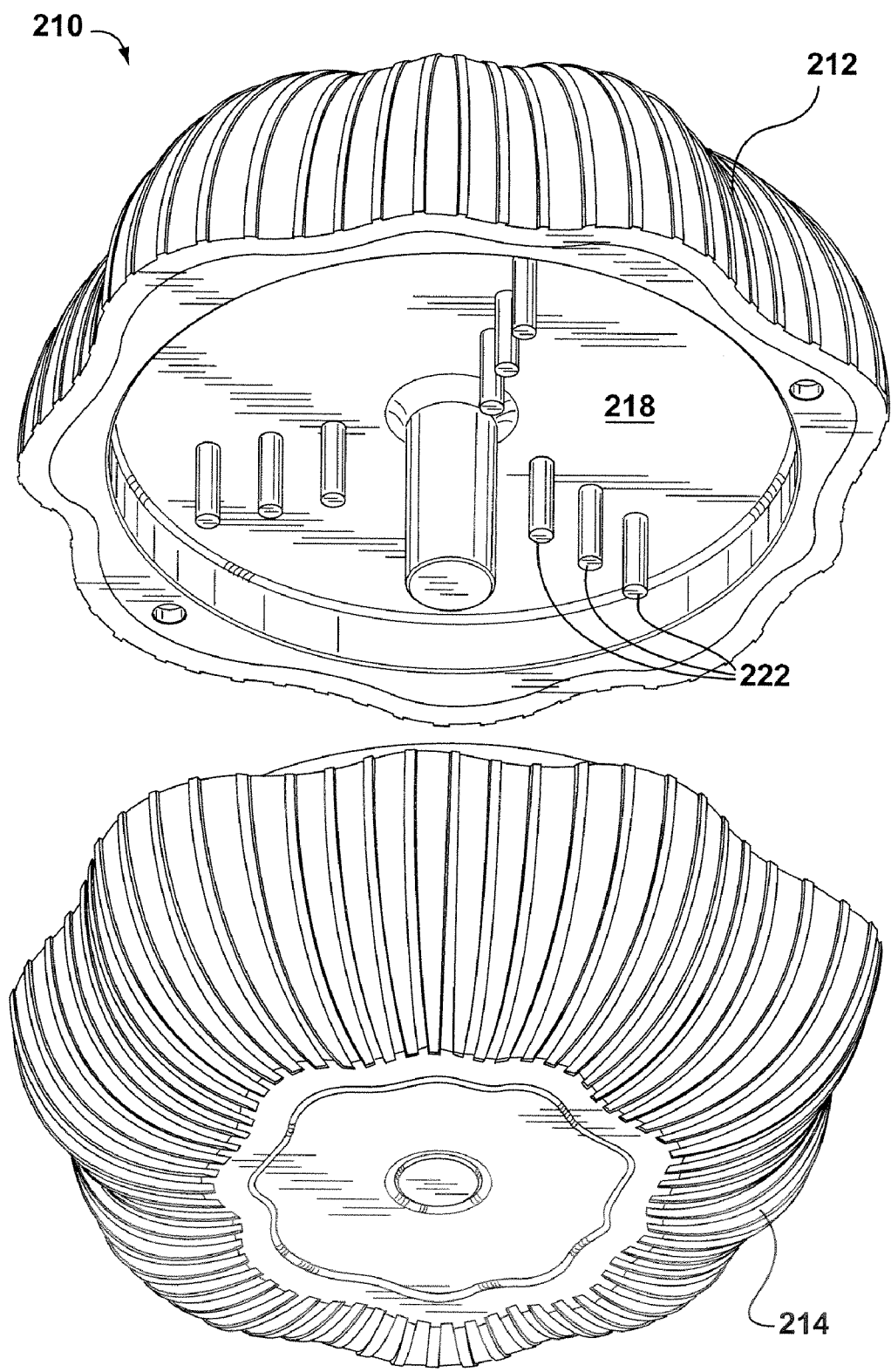
FIG. 14 is a lower perspective view of the food grinder of FIG. 13.

Referring now to FIGS. 13 and 14, illustrated therein is another example of a food grinder 210. The food grinder 210 is similar to the food grinder 10 described above, and like features are identified by like reference characters, incremented by 200.

In the food grinder 210, the bottom shell 214 or bottom body portion comprises bottom teeth 236 that can be generally pin-shaped, having axially oriented cylindrical outer surfaces. The top shell 212 has, in the example illustrated top teeth 222 that are similarly pin-shaped.

The top and bottom teeth 222, 236 of the grinder 210 may be configured in one or more radially aligned rows of teeth. In the example illustrated, the top teeth 222 are configured in three radial rows extending from the top axis 216 to the periphery 244. The three rows of top teeth 222 can be generally equally spaced in the circumferential direction for example by about 120 degrees. The bottom teeth 236 are, in the example illustrated, arranged in four radial rows that are generally equally spaced apart by about 90 degrees in the circumferential direction.

Figure 15:
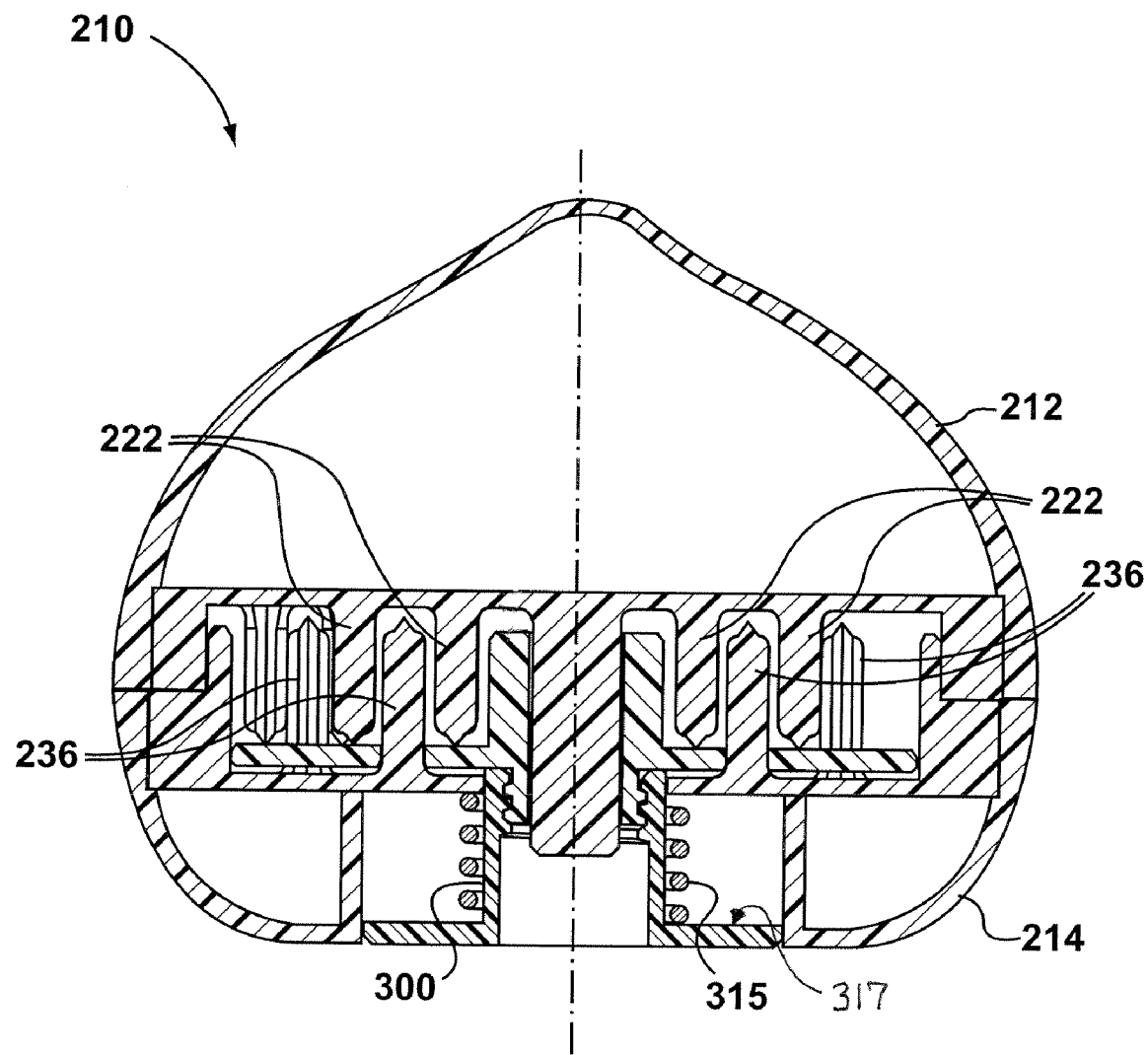
FIG. 15 is a cross-sectional view of the food grinder of FIG. 13 with top and bottom parts coupled together.

The grinder 210 can be provided with a plunger 300 in one or both of the top and bottom shells 212, 214. In the example illustrated, the plunger 300 is provided in the bottom shell 214. In some examples, the plunger 300 may be biased to a retracted position. For example, in example illustrated, the bottom shell 214 includes an axial compression spring 315 shown schematically (referring to FIG. 15), the spring 315 disposed between an interior upper surface 317 of an actuator flange and underside of the bottom shell 214.

While the above description provides examples of one or more processes or apparatuses, it will be appreciated that other processes or apparatuses may be within the scope of the accompanying claims.

The invention claimed is:

1. A grinder for a food item, comprising:
   a) a top shell having a top axis, a top inner surface disposed about the top axis, and a plurality of top teeth extending downwardly from the top inner surface;
   b) a bottom shell for moving between a first position in which the bottom shell is spaced apart from the top shell, and a second position in which the top shell and bottom shell are coupled together, the bottom shell having a bottom axis, a bottom inner surface disposed about the bottom axis, a sidewall extending upwardly from the bottom inner surface and defining a cavity, and a plurality of bottom teeth extending upwardly from the bottom inner surface; and
   c) a plunger slidable within the cavity between a retracted position and an advanced position, the plunger having an upper surface directed away from the bottom inner surface, the upper surface having a perimeter configured for slidable engagement with an inner surface of the sidewall and a plurality of apertures in registration with the plurality of bottom teeth;
   d) wherein in the retracted position an upper surface of the plunger is axially set back from an upper edge of the sidewall towards the bottom inner surface, and in the advanced position the upper surface of the plunger is axially displaced away from the bottom inner surface to position at least generally flush with the upper edge of the sidewall, each aperture receiving a respective one of the bottom teeth therethrough when the plunger is urged from the advanced position to the retracted position; and
   e) wherein the top axis and the bottom axis are generally collinear and define a rotation axis about which the top and bottom shells are rotatable relative to each other when the top and bottom shells are coupled together.

2. The grinder of claim 1, wherein a gap between a peripheral edge of the upper surface of the plunger and the sidewall is minimal, and the peripheral edge has guide portions for slidably engaging with guide rails in the sidewall.

3. The grinder of claim 1, wherein the plunger has a plunger plate removably coupled to the bottom shell.

4. The grinder of claim 1, wherein the plunger is biased to return to the retracted position, and the plunger is movable from the retracted position to the advanced position when the bottom shell is spaced apart from the top shell.

5. The grinder of claim 1, wherein the top shell and bottom shell are configured to have an exterior shape corresponding to a food product.

6. The grinder of claim 1, further comprising an actuator coupled to the grinder for moving the plunger within the cavity, the actuator configured to inhibit movement of the upper surface of the plunger substantially beyond the upper edge of the sidewall.

7. The grinder of claim 1, wherein the top shell comprises a second plunger slidable between a retracted position and an extended position.

8. A grinder for a food item, comprising:
   a) a top shell having a top axis and a top inner surface disposed about the top axis, the top inner surface having a top toothed region comprising a plurality of top teeth extending downwardly from the top inner surface, and the top inner surface having a top non-toothed region being substantially free of top teeth;
   b) a bottom shell movable between a first position in which the bottom shell is spaced apart from the top shell, and a second position in which the top shell and bottom shell are coupled together, the bottom shell having a bottom axis, a bottom inner surface disposed about the bottom axis, and a sidewall extending upwardly from the bottom inner surface and defining a cavity, the bottom inner surface having a bottom toothed region comprising a plurality of bottom teeth extending upwardly from the bottom inner surface, and the bottom inner surface having a bottom non-toothed region being substantially free of bottom teeth;
   c) wherein, when the top and bottom shells are coupled together, the top axis and the bottom axis are generally collinear and define a rotation axis about which the top and bottom shells are rotatable relative to each other, the top non-toothed region and the bottom non-toothed region are configured to at least partially align in vertical registration, and the top teeth and bottom teeth are configured to interlace with one another when the top and bottom shells are rotated,
   wherein the top non-toothed region comprises at least one top non-toothed sector extending radially from the top axis to an outer periphery of the top inner surface, and the top toothed region comprises at least one top toothed sector extending radially from the top axis to the outer periphery of the top inner surface,
   and wherein the bottom non-toothed region comprises at least one bottom non-toothed sector extending radially from the bottom axis to an outer periphery of the bottom inner surface, and the bottom toothed region comprises at least one bottom toothed sector extending radially from the bottom axis to the outer periphery of the bottom inner surface.

9. The grinder of claim 8, wherein each of the top and bottom non-tooth sectors spans an angle of at least 45 degrees.

10. The grinder of claim 8 wherein the top and bottom shell include alignment indicators that indicate when the top non-toothed region and the bottom non-toothed region are aligned in vertical registration.

11. The grinder of claim 10 wherein the alignment indicators include the top shell having a top asymmetric profile and the bottom shell having a bottom asymmetric profile corresponding to the top asymmetric profile, the top non-toothed region and the bottom non-toothed region being aligned in vertical registration when the top and bottom asymmetric profiles are aligned.

12. The grinder of claim 10 wherein the alignment indicators include at least one top magnet in the top shell and at least one bottom magnet in the bottom shell, the top non-toothed region and the bottom non-toothed region being aligned in vertical registration when the at least one top and bottom magnets are engaged.

13. The grinder of claim 8, wherein at least one of the top teeth and bottom teeth are arranged in an arc pattern having a leading tooth and a trailing tooth, the trailing tooth circumferentially and radially spaced from the leading tooth.

14. The grinder of claim 13, wherein the arc pattern comprises an s-shaped pattern with a middle tooth circumferentially and radially spaced from both the leading tooth and the trailing tooth.

15. The grinder of claim 8, wherein each of the top teeth and bottom teeth have radially inner and radially outer surfaces extending in a generally circumferential direction, the radially outer surface being generally convex, and the radially inner surface being generally concave, and the radially inner and outer surfaces of the teeth converge to define cutting edges.

16. The grinder of claim 8, wherein the bottom teeth extend upward adjacent the top inner surface and the top teeth extend downward adjacent the bottom inner surface when the top and bottom shells are coupled together.

17. The grinder of claim 8, wherein the top teeth and bottom teeth define lanes that substantially occupy a radial distance between the rotation axis and the sidewall when the top and bottom shells are coupled together.

18. A grinder for a food item, comprising:
   a) a top shell having a top axis, a top inner surface disposed about the top axis, and a plurality of top teeth extending downwardly from the top inner surface;
   b) a bottom shell for moving between a first position in which the bottom shell is spaced apart from the top shell, and a second position in which the top shell and bottom shell are coupled together, the bottom shell having a bottom axis, a bottom inner surface disposed about the bottom axis, a plurality of bottom teeth extending upwardly from the bottom inner surface, and a sidewall extending upwardly from the bottom inner surface and defining a cavity; and
   c) a plunger slidable within the cavity between a retracted position and an advanced position, the plunger having an upper surface directed away from the bottom inner surface, the upper surface having a perimeter configured for slidable engagement with an inner surface of the sidewall and a plurality of apertures in registration with the plurality of bottom teeth;
   d) wherein in the retracted position an upper surface of the plunger is axially set back from an upper edge of the sidewall towards the bottom inner surface, and in the advanced position the upper surface of the plunger is axially displaced away from the bottom inner surface to position at least generally flush with the upper edge of the sidewall, each aperture receiving a respective one of the bottom teeth therethrough when the plunger is urged from the advanced position to the retracted position;
   e) wherein the top axis and the bottom axis are generally collinear and define a rotation axis about which the top and bottom shells are rotatable relative to each other when the top and bottom shells are coupled together, and at least some of the top teeth and the bottom teeth are arranged in an arc pattern.

* * * * *